United States Patent [19]

Karasaki et al.

[11] Patent Number: 4,992,818
[45] Date of Patent: * Feb. 12, 1991

[54] FOCUS DETECTING DEVICE

[75] Inventors: Toshihiko Karasaki; Kazumi Sugitani, both of Osaka, Japan

[73] Assignee: Minolta Camera Kabushiki Kaisha, Osaka, Japan

[*] Notice: The portion of the term of this patent subsequent to Feb. 13, 2007 has been disclaimed.

[21] Appl. No.: 191,016

[22] Filed: May 6, 1988

[30] Foreign Application Priority Data

May 8, 1987 [JP] Japan .................. 62-113186

[51] Int. Cl.$^5$ .................. G03B 13/36; G02B 7/34
[52] U.S. Cl. .................. 354/407; 250/201.8
[58] Field of Search ............... 354/402, 406, 407, 408, 354/403, 201 AF; 250/201 PF, 204, 201.2, 201.8

[56] References Cited

U.S. PATENT DOCUMENTS

| 4,002,899 | 1/1977 | Stauffer | 250/201 |
|---|---|---|---|
| 4,230,941 | 10/1980 | Stauffer | 250/204 |
| 4,329,033 | 5/1982 | Masunaga et al. | 354/408 X |
| 4,632,532 | 12/1986 | Matsumura | 354/407 X |
| 4,716,431 | 12/1987 | Shindo | 354/407 |
| 4,768,052 | 8/1988 | Hamada et al. | 354/406 X |
| 4,843,415 | 6/1989 | Matsui et al. | 354/403 |
| 4,901,102 | 2/1990 | Karasaki et al. | 354/402 X |
| 4,908,504 | 3/1990 | Karasaki et al. | 354/408 X |

FOREIGN PATENT DOCUMENTS 58-156909  9/1983  Japan .
62-3216    1/1987  Japan .
62-168107  7/1987  Japan .

Primary Examiner—W. B. Perkey
Attorney, Agent, or Firm—Burns, Doane, Swecker & Mathis

[57] ABSTRACT

A focus detecting device which comprises an objective lens for forming an image of an object, a condenser lens, located behind a predetermined focal plane of the objective lens, for converging the light passed through the objective lens, a pair of image re-forming lenses, located behind the condenser lens, for re-forming a pair of secondary images of the image formed by the objective lens on an off-axial region of the objective lens located at a position far from the optical axis thereof, a light direction changing device, located nearby the condenser lens, for changing the direction along which light bundles forming the secondary images passes towards the optical axis, and a light receiving device for receiving the pair of the secondary images formed by the secondary image forming means to produce a light intensity distribution signal representing the light intensity distribution of the secondary images, a focus condition calculating device for calculating a focus condition of the objective lens by means of detecting the positions of the pair of the secondary images in accordance with the light intensity distribution signal.

9 Claims, 4 Drawing Sheets

FOCUS DETECTING DEVICE

BACKGROUND OF THE INVENTION

1. Field of the Invention

The present invention generally relates to a focus detecting device for multi-point focus detection in which a combination of an axial focus detection area and an off-axial focus detection area is employed.

In the multi-point focus detection in which not only is the axial focus detection area employed, but the off-axial focus detection area is also employed, the use of an optical system for axial focus detection as an optical system for off-axial focus detection will bring about the following problems. Specifically, if the off-axial focus detection area is spaced a distance from the optical axis in order to avoid any possible interference between an axial light flux for the axial focus detection and an off-axial light flux for the off-axial focus detection, the off-axial focus detection optical system for receiving a light flux from the off-axial focus detection area of the object must also be spaced a sufficient distance from the optical axis. Accordingly, a CCD (charge-coupled device) chip in which a plurality of CCDs, each of which has a plurality of light receiving elements, are formed on a single chip tends to become bulky in size, rendering an AF (auto-focus) module to be correspondingly bulky in size and high in manufacturing cost. On the other hand, if the size of the CCD chip is reduced, the off-axial light flux will become so close to the on-axis light flux as to result in the undesirable interference between these light fluxes, rendering an optical system such as condenser lenses, etc., to be very complicated.

2. Summary of the Invention

Accordingly, the present invention has for its essential object to provide an improved focus detecting device which is very simple in construction and makes it possible for the CCD chip to be manufactured small thereby to make the AF module compact and low in manufacturing cost.

In order to accomplish the above described object, the present invention provides a focus detecting device which comprises an objective lens for forming an image of an object, a condenser lens, located behind a predetermined focal plane of the objective lens, for converging the light passed through the objective lens, a pair of image reforming lenses, located behind the condenser lens, for re-forming a pair of secondary images of the image formed by the objective lens on an off-axial region of the objective lens located at a position far from the optical axis thereof, a light direction changing means, located nearby the condenser lens, for changing the direction along which light bundles forming the secondary images passes towards the optical axis, and a light receiving means for receiving the pair of the secondary images formed by the secondary image forming means to produce a light intensity distribution signal representing the light intensity distribution of the secondary images, a focus condition calculating means for calculating a focus condition of the objective lens by means of detecting the positions of the pair of the secondary images in accordance with the light intensity distribution signal.

According to the present invention, the light flux coming from the off-axial focus detection area which has passed through the objective lens can be directed by the light direction changing means, either before it passes through the condenser lens or after it has passed through the condenser lens, so as to travel towards the optical axis and then to enter the image re-forming lenses. For this purpose, the light direction changing means may be positioned either in front of or rearwardly of the condenser lens with respect to the direction of travel of rays of light towards the image re-forming lens system. The light flux from the off-axial focus detection area, which is incident upon the image re-forming lens system, is focused by the pair of the image re-forming lenses on the light receiving means in the form of a pair of images. Accordingly, it is possible to maintain a substantial distance between the optical axis and the off-axial focus detection area even when the light receiving elements are reduced in size.

BRIEF DESCRIPTION OF THE DRAWINGS

This and other objects and features of the present invention will become clear from the following description taken in conjunction with preferred embodiments thereof with reference to the accompanying drawings in which like parts are designated by like reference numerals and in which.

DETAILED DESCRIPTION OF THE EMBODIMENTS

Figure 1:
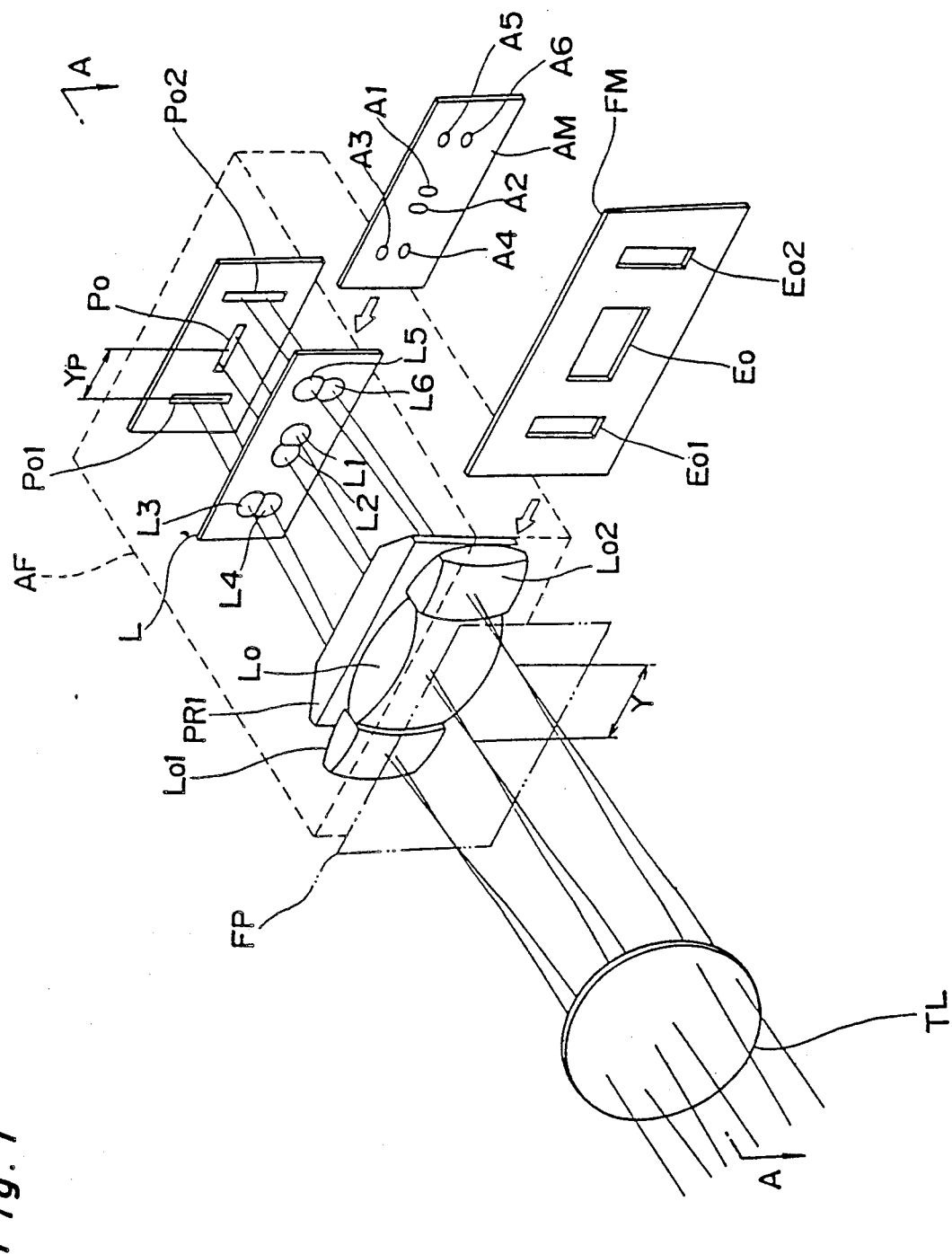
FIG. 1 is a schematic perspective view of a focus detecting optical system according to a preferred embodiment of the present invention.

Referring first to FIG. 1, a focus detecting optical system shown therein comprises an AF (auto-focus) sensor module shown as a phantom block AF. An objective lens TL is shown as positioned in front of the AF sensor module AF with respect to the direction of travel of rays of light towards the AF sensor module AF, particularly CCD line sensors Po, Po1 and Po2.

The AF sensor module AF includes a generally rectangular field mask FM disposed on a predetermined image plane FP of the objective lens TL. The generally rectangular field mask FM has defined therein a generally rectangular horizontal opening Eo, extending in alignment with the longitudinal axis of the field mask FM, and a pair of generally rectangular vertical openings Eo1 and Eo2 positioned on respective sides of the horizontal opening Eo and extending perpendicular to the longitudinal axis of the field mask FM. Light fluxes passing respectively through the openings Eo, Eo1 and Eo2 travel through and converged by condenser lenses Lo, Lo1 and Lo2, respectively, and then enter a light deflecting member PR1 disposed on one side of the condenser lenses Lo, Lo1 and Lo2 opposite to the field mask FM and rearwardly of the condenser lenses Lo, Lo1 and Lo2 with respect to the direction of travel thereof towards the CCD line sensors Po, Po1 and Po2.

The light deflecting member PR1 so far shown therein is of a type made of a transparent material and comprising a generally rectangular plate-like body having its opposite surface parallel to each other and a pair of generally wedge-shaped wing portions on respective sides of the plate-like body, said wing portions having respective rear surfaces inclined at a predetermined angle so as to converge with each other at a point away from the plate-like body in a direction close towards the CCD line sensors Po, Po1 and Po2.

Positioned between the light deflecting member PR1 and the line sensors Po, Po1 and Po2 is a lens plate L. This lens plate L is of a generally rectangular shape and has defined therein a pair of image re-forming lenses L1 and L2, positioned in side-by-side fashion in alignment with the longitudinal axis of the lens plate L, and pairs of image re-forming lenses L3 and L4, L5 and L6 defined on respective sides of the paired image re-forming lenses L1 and L2, the image re-forming lenses L3 and L4 or L5 and L6 of each pair being positioned one above the other in a direction perpendicular to the longitudinal axis of the lens plate L. Each of the image re-forming lenses L1 to L6 formed on the lens plate L is a plano-convex lens having the same radius of curvature and, therefore, one of the opposite surfaces of the lens plate L is flat while the other of the same is formed with projections equal in number to and aligned in position with the respective image re-forming lenses L1 to L6. A generally rectangular aperture mask AM having three sets of paired oval apertures A1 and A2, A3 and A4, A5 and A6 positioned frontwardly of, and held in contact with the flat surface of, the lens plate L with the paired oval apertures A1 and A2, A3 and A4, A5 and A6 aligned with the paired image re-forming lenses L1 and L2, L3 and L4, L5 and L6, respectively.

The focus detecting optical system shown in FIG. 1 includes a plurality of optical blocks. The first optical block includes the condenser lens Lo and the pair of image re-forming lenses L1, L2. A second optical block includes the condenser lens Lo1 and the pair of image re-forming lenses L3, L4. A third optical block includes the condenser lens Lo2 and the pair of image re-forming lenses L5, L6.

The CCD line sensors Po, Po1 and Po2 are all mounted on a generally rectangular substrate with the line sensor Po positioned between the line sensors Po1 and Po2 and also with the line sensor Po extending horizontally and perpendicular to any one of the line sensors Po1 and Po2. The carrier substrate for the CCD line sensors Po, Po1 and Po2 is so positioned behind the lens plate L that not only can the line sensors Po, Po1 and Po2 be aligned with the paired image re-forming lenses L1 and L2, L3 and L4, L5 and L6, respectively, but also the longitudinal axis of each of the line sensors Po, Po1 and Po2 can assume a parallel relationship with the direction in which the associated paired image re-forming lenses L1 and L2, L3 and L4, L5 and L6 adjoin with each other. With the CCD line sensors Po, Po1 and Po2 so supported and so positioned as hereinbefore described, each of the CCD line sensors Po, Po1 and Po2 is comprised of first and second rows of a plurality of light receiving elements, the first and second element rows being substantially continued in end-to-end fashion with each other so that images formed by the paired image re-forming lenses L1 and L2, L3 and L4, L5 and L6, respectively, can be projected onto the first and second element rows of the associated CCD line sensor Po, Po1 or Po2.

Figure 2:
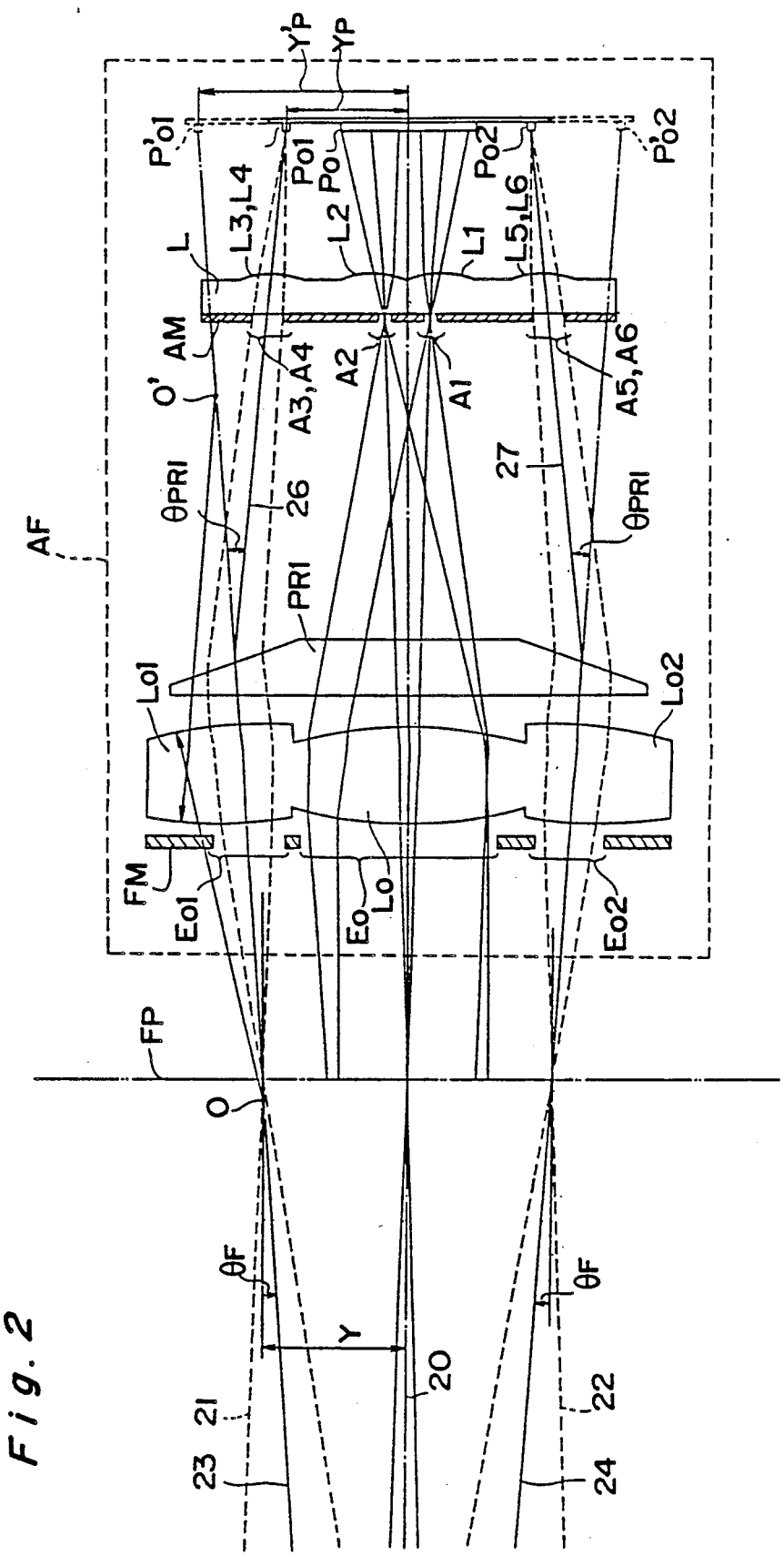
FIG. 2 is a schematic cross-sectional view taken along the line A—A shown in FIG. 1.

FIG. 2 illustrates the cross-section taken along the line A—A in FIG. 2. As shown, each of off-axial light fluxes 21 and 22, having a respective principal light beam 23 or 24 travelling towards the field mask FM so as to be far away from an optical axis 20 at a respective angle $\theta F$ relative to the optical axis 20, passes through the respective rectangular opening Eo1 or Eo2 in the field mask FM and then through the respective condenser lens Lo1 or Lo2 before it enters the light deflecting member PR1. Each off-axial light flux 21 or 22 having entered the light deflecting member PR1 is deflected by a gradient of a rear surface of the light deflecting member PR1 so as to travel towards the optical axis and, thereafter, a principal light beam 26 or 27 is, after having been again deflected at a respective angle $\theta PR1$ relative to the original principal light beam 23 or 24, projected onto the associated CCD line sensor Po1 or Po2 through the aperture mask AM and the image re-forming lens plate L. In this way, images are re-formed on the respective CCD line sensors Po1 and Po2 and, therefore, the intended focus detection can be accomplished by the determination of the positions of those images so formed on the associated line sensors Po1 and Po2.

In FIG. 2, reference character Y represents the distance measured on the predetermined image plane FP between each principal light beam 23 or 24 and the optical axis, that is, the distance of an off-axial focus detection sensitivity region away from the optical axis 20. This distance Y is necessitated to avoid any possible interference between the axial light flux and the off-axial light flux and is preferred to be as great as possible in order to increase a focus detection area. Also, the angle $\theta F$ (The arrow-headed direction shown in FIG. 2 is assumed to be positive.) is an angle of deviation provided for avoid any possible vignetting of the off-axial light flux with respect to a pupil even though any one of a variety of interchangeable lenses of different focal lengths is employed. This angle of deviation $\theta F$ is equal to or greater than zero and, therefore, the focus detection light flux traveling off the axis is parallel to, or oriented inwardly of the optical axis.

Let it be assumed that the light deflecting member PR1 does not exist. In this condition, respective images carried by the off-axial light fluxes are, after having passed through the condenser lenses Lo1 and Lo2, the aperture mask AM and the image re-forming lens plate L, reformed on imaginary CCD line sensors P'o1 and P'o2 in the form of paired images. Under these circumstances, the distance Y'p between the optical axis 20 and the imaginary line sensor P'o1 will be greater than the distance Y between the optical axis 20 and the off-axial focus detection sensitivity region in view of the presence of the angle $\theta F$. This means that, if the distance Y is selected to be large, the distance Y'p increases correspondingly. In other words, if the off-axial focus detection area is separated away from the optical axis 20, the distance between the CCD line sensor and the optical axis 20 relative to the off-axial focus detection area increases correspondingly, thereby interrupting the integration of the CCD line sensor into a single chip. On the other hand, where the light deflecting member PR1 exists, the off-axial light fluxes are deflected through the condenser lenses Lo1 and Lo2 so as to travel towards the optical axis and the respective images carried thereby are re-formed on the CCD line sensors Po1 and Po2 after having passed through the aperture mask AM and the image re-forming lens plate L. At this time, the distance Yp between the optical axis 20 and the CCD line sensor Po1 is equal to or smaller than the distance between the optical axis 20 and the off-axial focus detection sensitivity region, provided that the angle $\theta F$ is equal to or smaller than the angle $\theta PR1$. In other words, by selecting the gradient of the rear surface of the light deflecting member PR1 so as to cause the angle $\theta F$ to be equal to or smaller than the angle $\theta PR1$, it is possible to minimize the distance Yp between the optical axis 20 and any one of the CCD line sensors Po1 and Po2 regardless of the distance between the optical axis and the off-axis focus detection area.

In view of the foregoing, the CCD chip in which the CCD line sensors Po, Po1 and Po2 are formed on the same chip can be miniaturized, contributing to a marked reduction in manufacturing cost. Also, the width of each of the aperture mask AM and the image re-forming lens plate L can be reduced and, therefore, the focus detecting optical system as a whole can be manufactured compact.

Figure 3:
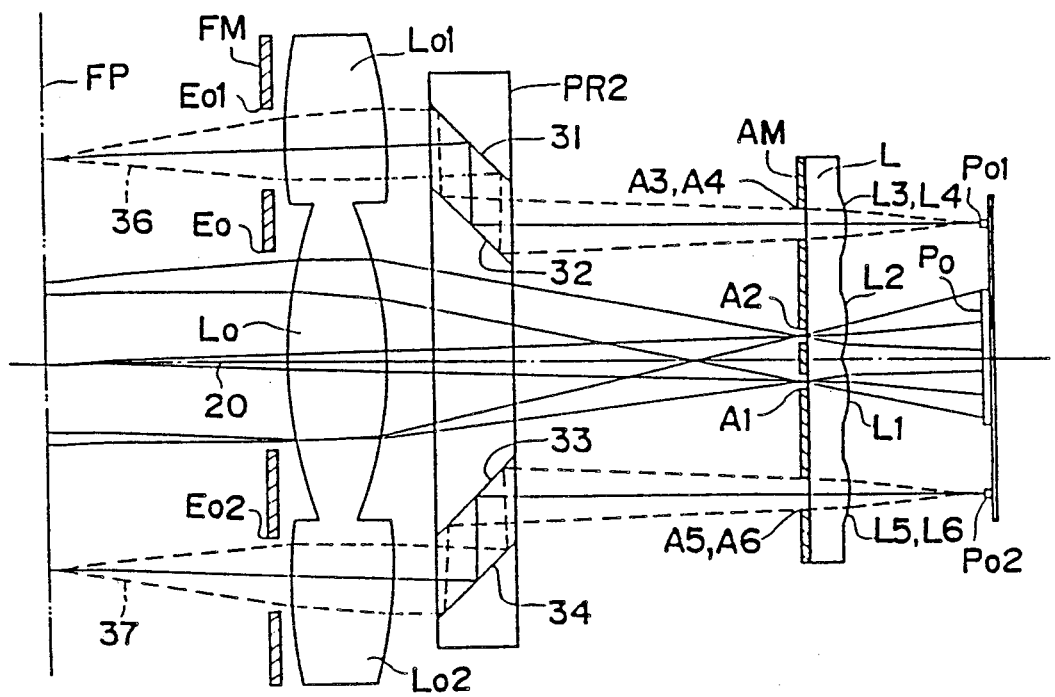
FIGS. 3 to 6 are views generally similar to FIG. 2, showing the focus detecting optical system according to second to fifth preferred embodiments of the present invention, respectively.

FIGS. 3 to 6 illustrate different embodiments of the focus detecting device according to the present invention. In the embodiment of FIG. 3, the light deflecting member now identified by PR2 comprises two sets of pairs of mirror surfaces 31 and 32, 33 and 34. In this arrangement, each of off-axial light fluxes 36 and 37 entering the light deflecting member PR2 is reflected by the corresponding mirror surfaces 31 and 32 or 33 and 34 of the light deflecting member PR2 in a direction towards the optical axis 20.

Figure 4:
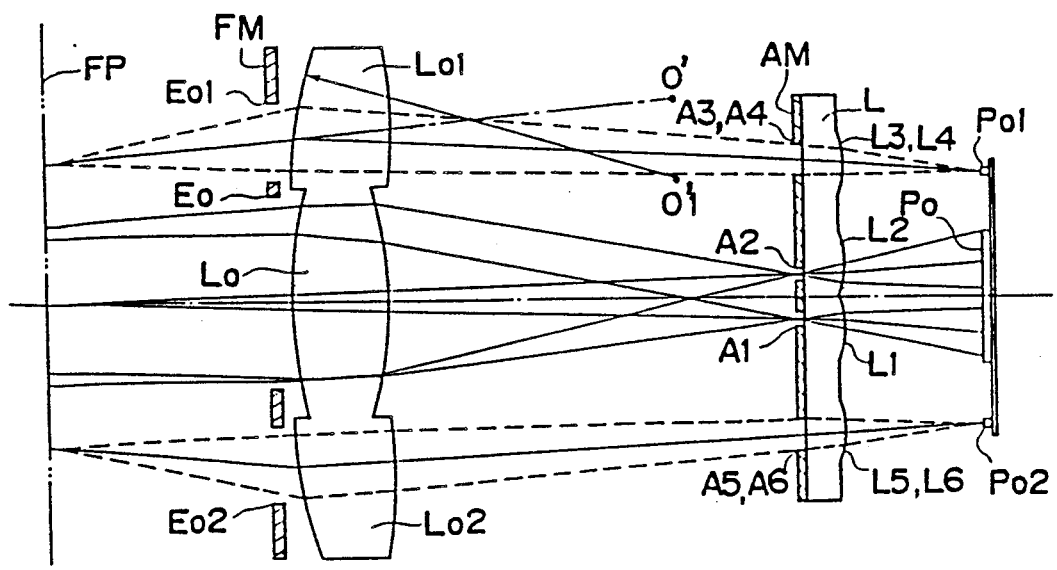
Figure 5:
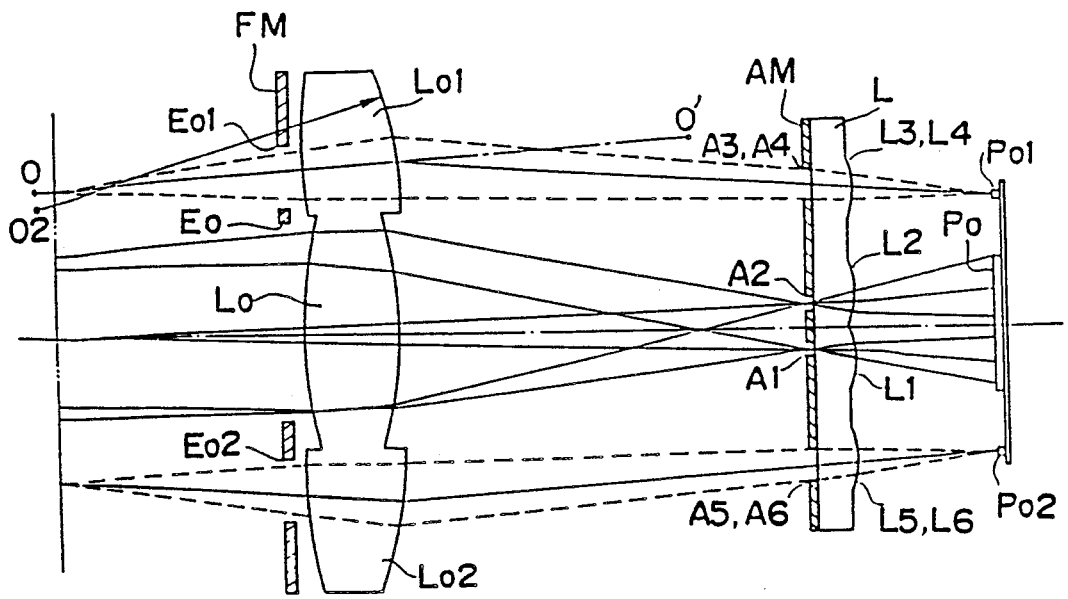
Figure 6:
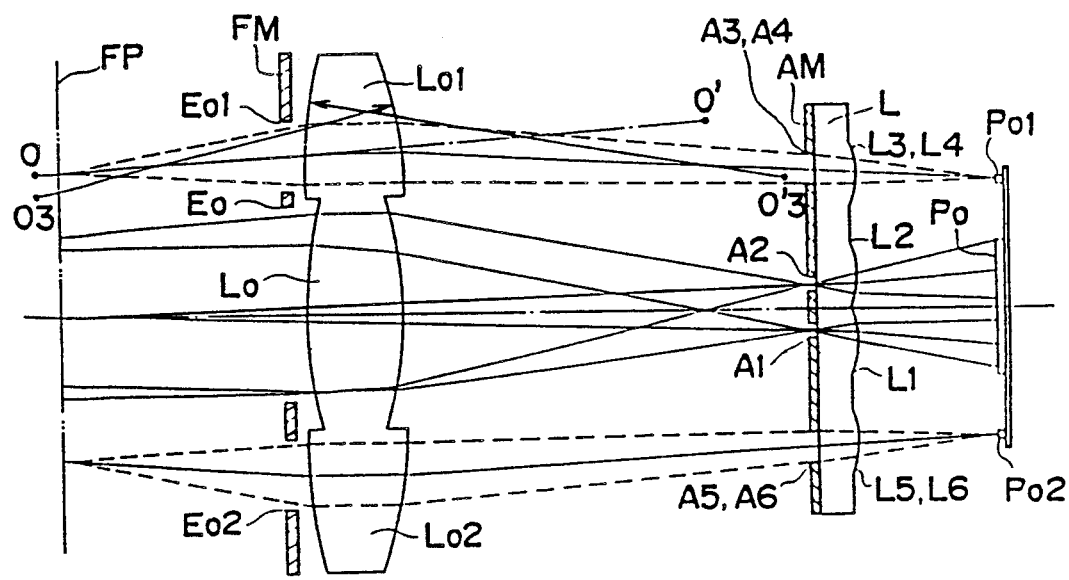

In any one of the embodiments shown in FIGS. 4 to 6, respectively, the light deflecting member is integrally formed with the condenser lenses. Specifically, although in the embodiment shown in and described with reference to FIGS. 1 and 2 the center O or O' of spherical surfaces of each of the condenser lenses Lo1 and Lo2 has been shown as positioned on the principal light beam of the associated axial light flux, the embodiment of FIG. 4 is such that the center O'1 of a front spherical surface of each of the condenser lenses Lo1 and Lo2 is positioned offset from the original position O' towards the optical axis 20 to make it have a light deflecting capability. In the embodiment of FIG. 5, the center O2 of a rear spherical surface of each of the condenser lenses Lo1 and Lo2 is positioned offset from the original position O towards the optical axis 20 to make it have a light deflecting capability. In the embodiment of FIG. 6, the centers O3 and O'3 of front and rear spherical surfaces of each of the condenser lenses Lo1 and Lo2 are positioned offset from the original positions O and O' towards the optical axis 20 to make it have a light deflecting capability. It is to be noted that, in any one of the embodiments shown respectively in FIGS. 4 to 6, the centers O'1, O2, O3 and O'3 are all positioned on one side of the boundary between the condenser lens Lo1 (or Lo2) and the condenser lens Lo adjacent the condenser lens Lo. By so positioning, top points of respective spherical surfaces (that is, the point of intersections between lines parallel to the optical axis 20 and drawn through the centers of spherical surfaces) lie on the spherical surface of all of the condenser lenses and, therefore, the relative position of these condenser lenses Lo, Lo1 and Lo2 can be easily verified subsequent to the molding. According to any one of the embodiments of FIGS. 4 to 6, the intended object of the present invention can be accomplished with no need to use any special optical member.

From the foregoing description of the present invention, it is clear that, since a light deflecting means is provided on one or both of front and rear surface of the condenser lens so that the light flux from the off-axis distance measuring area can be deflected by the light deflecting means so as to travel towards the optical axis, it is possible to miniaturize the CCD chip having a simple construction even though the off-axial focus detection area is separated away from the optical axis and the AF sensor module can be manufactured compact at reduced manufacturing cost.

Although the present invention has fully been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:
1. A focus detecting device, comprising:
an objective lens for forming an image of an object;
a plurality of optical blocks each of which is composed of a condenser lens, located behind the objective lens, for converging the light passed through the objective lens; and a pair of image re-forming lenses, located behind the condenser lens, for re-forming a pair of secondary images of the image formed by the objective lens;
a light receiving means for receiving the pair of the secondary images formed by the secondary image forming means to produce a light intensity distribution signal representing the light intensity distribution of the secondary images, said light receiving means including a plurality of light receiving units, each of which corresponds to each of the plurality of optical blocks; and
a focus condition calculating means for calculating a focus condition of the objective lens by means of detecting the distance between the pair of the secondary images in accordance with the light intensity distribution signal.

2. A focus detecting device as claimed in claim 1, wherein all of the condenser lenses included in all of the plurality of optical blocks are provided integrally with each other.

3. A focus detecting device as claimed in claim 1, wherein all of the pairs of image re-forming lenses included in all of the plurality of optical blocks are provided integrally with each other, and all of the plurality of light receiving units are also provided integrally with each other.

4. A focus detecting device as claimed in claim 3, wherein the plurality of the optical blocks includes an optical block located on the optical axis and at least one off-axial optical block located at a position far from the optical axis.

5. A focus detecting device as claimed in claim 4, wherein the off-axial optical block includes light direction changing means for changing the direction along which the light bundles pass therethrough towards the optical axis, said light direction changing means being provided integrally with the condenser lens included in the off-axis optical block.

6. A focus detecting device as claimed in claim 5, wherein the light direction changing means is composed of an object side surface of the condenser lens.

7. A focus detecting device as claimed in claim 5, wherein the light direction changing means is composed of an image side surface of the condenser lens.

8. A focus detecting device as claimed in claim 5, wherein the light direction changing means is composed of both of the object side surface of the condenser lens and the image side surface of the condenser lens.

9. A focus detecting device as claimed in claim 4, wherein the off-axial optical block includes light direction changing means for changing the direction along which the light bundles pass therethrough towards the optical axis, said light direction changing means being located nearby the condenser lens included in the off-axial optical block.

* * * * *